United States Patent
Lang et al.

(10) Patent No.: US 11,705,286 B2
(45) Date of Patent: Jul. 18, 2023

(54) ENHANCED CAPACITOR TABS

(71) Applicant: Solaredge Technologies Ltd., Herzeliya (IL)

(72) Inventors: Joel Lang, Givataim (IL); Ronit Romm, Jerusalem (IL); Bryon Roos Gomberg, Kfar Sava (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 17/133,717

(22) Filed: Dec. 24, 2020

(65) Prior Publication Data

US 2021/0202185 A1 Jul. 1, 2021

Related U.S. Application Data

(60) Provisional application No. 62/954,801, filed on Dec. 30, 2019.

(51) Int. Cl.
| | |
|---|---|
| *H01G 9/008* | (2006.01) |
| *H01G 9/02* | (2006.01) |
| *H01G 9/00* | (2006.01) |
| *H01G 9/048* | (2006.01) |
| *H01G 9/15* | (2006.01) |

(52) U.S. Cl.
CPC ........... *H01G 9/008* (2013.01); *H01G 9/0029* (2013.01); *H01G 9/02* (2013.01); *H01G 9/048* (2013.01); *H01G 9/151* (2013.01)

(58) Field of Classification Search
CPC .................................. H01G 9/008; H01G 9/02
See application file for complete search history.

(56) References Cited

FOREIGN PATENT DOCUMENTS

| | | | |
|---|---|---|---|
| EP | 3467857 A1 | | 4/2019 |
| JP | 49061036 U | * | 9/1947 |
| JP | H0645202 A | | 2/1994 |
| JP | 09129508 A | * | 5/1997 |
| JP | 11176688 A | * | 7/1999 |
| JP | 2006147703 A | * | 6/2006 |
| JP | 2009212283 A | | 9/2009 |
| JP | 2015207682 A | | 11/2015 |
| KR | 20170113782 A | | 10/2017 |
| WO | 03/100802 A1 | | 12/2003 |
| WO | WO-2019172465 A1 | * | 9/2019 |

OTHER PUBLICATIONS

STIC translation of [0009]—JP2009212283A.*
Dialog translation of [0025]—JP 06045202.*
Jun. 7, 2021—European Search Report—EP20216696.3.

* cited by examiner

*Primary Examiner* — Eric W Thomas
(74) *Attorney, Agent, or Firm* — Banner & Witcoff, Ltd.

(57) ABSTRACT

A capacitor manufacturing method is disclosed herein that includes a process for the isolation of electrode tabs attached to the capacitors' electrodes from other elements in the capacitor. An isolation patch or layer may be deposited over the tabs by a machine or a device after the tab is attached and before the electrodes are wound into a cylindrical internal element of a capacitor. The device may coat the tabs and surrounding regions with an isolating material. Electrode tabs may be provided with an isolating material pre-deposited at least in part over the tabs.

18 Claims, 4 Drawing Sheets

ENHANCED CAPACITOR TABS

CROSS-REFERENCE TO RELATED APPLICATIONS

This application claims priority to U.S. Provisional Application No. 62/954,801 filed on Dec. 30, 2019, hereby incorporated by reference in its entirety.

BACKGROUND

The present disclosure relates to the field of electric components and devices containing electric components.

Capacitors include electric components that store electrical energy as charge on parallel plates of conducting electrodes, such as an anode and a cathode. The electrodes may be separated by separator paper, dielectric layers, or electrolyte materials. Sheets of electrodes and separators may be packed, folded or rolled into various shapes to form the internal elements of electrolytic capacitors. The internal elements may be packed in an inner cavity of a case, such as a can closed with a cap, or packed in a sealed enclosure or pouch. The internal elements may also include tabs configured to electrically connect the electrodes to terminals traversing the case of the capacitor. The internal elements may also include leads connected to the electrodes and/or tabs, and the leads may extend externally from the case.

SUMMARY

The following summary is a short summary of some of the inventive concepts for illustrative purposes only and is not an extensive overview, and is not intended to identify key or critical elements, or to limit or constrain the inventions and examples in the detailed description. One skilled in the art will recognize other novel combinations and features from the detailed description.

A method for manufacturing capacitors is described herein, where the method includes isolation (e.g. mechanical, electrical, chemical-ionic, electrochemical, or chemical) of electrical terminal tabs of capacitor electrodes or opposing electrodes. An isolation patch may be deposited over the tabs by a machine or a device after the tab is attached, and before the electrodes are wound, folded or packed into a cylindrical internal element of the capacitor. The device may coat the tabs and surrounding regions with an isolating material. The device may apply an isolating film tape over the tab and/or the surrounding regions. The material used for the isolation process may be a polymer, a resin, a paper, an adhesive or combination thereof.

A method for manufacturing capacitors is described herein, where the method includes processing electrode tabs to a non-rectangular cross section shape. A tab may be cut from an electrode foil, producing rectangular cross section strips of tab material. The strips may be processed to change the cross section shape to non-rectangular, cut to a length corresponding to the length of the capacitor, and cold welding to an electrode of a capacitor. The strips may be processed during the cold welding, such as by stamping during the cold welding by forming a negative of the desired shape on the die adjacent to the tab. Processing may include milling, cutting, stamping, and/or slitting to modify the shape of the tab to a non-rectangular cross section shape. The electrode foil may comprise a first material, the electrode tabs may comprise a second material and the strips may comprise a third material.

As noted above, this summary is merely a summary of some of the aspects and features described herein. It is not exhaustive, and it is not to be a limitation on the claims.

BRIEF DESCRIPTION OF THE DRAWINGS

Certain features, aspects, and advantages of the present disclosure will become better understood with regard to the following description, claims, and drawings. The present disclosure is illustrated by way of example, and not limited by, the accompanying figures. In the drawings, like numerals reference similar elements.

DESCRIPTION

Figure 1A:
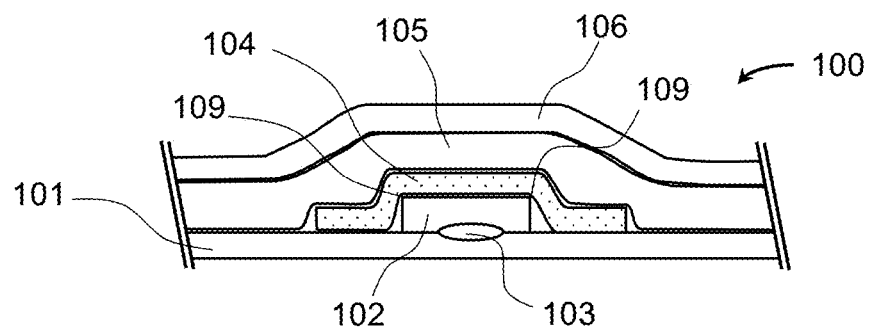
FIG. 1A shows a cross-section view of an example coated electrode tab.

As used herein, the terms isolating patch, isolating layer, coating, tape, film, and covering may be used interchangeably to mean a patch or a layer of isolating material selectively covering an electrode tab and the region of the electrode (such as a conducting film) adjacent to the tab. The term isolating material as used herein means a material of mechanical, electrical, ionic, electrochemical, and chemical properties that can effectively isolate the effect of each electrode tab on the adjacent electrodes and separator (such as mechanical, electrical, chemical-ionic, and/or electrochemical effects). The term case may be used to refer to a can/pouch, cap/seal, or enclosure.

A method for manufacturing capacitors is described herein, which includes a process for electrical, electrochemical, chemical-ionic, and/or mechanical isolation of tabs attached to a capacitor electrode foil. For example, after cold welding a tab to an electrode foil, a coating may be placed over the tab and adjacent foil area. The tab and/or surrounding foil may be covered or coated by spray coating, painting, coating, adhering, or depositing a film of isolating material. A manufacturing machine is described herein that may incorporate a resin coating process. The resin coating process may be positioned in the manufacturing line, such that the regions of the tabs (e.g., tabs and 1-10 millimeters of the surrounding electrode foil) undergo a coating with an electrical, mechanical, electrochemical, and/or chemical-ionic isolating material (e.g., a polymer, an epoxy, a resin, a ceramic, and/or an oxide layer). After coating the tabs, the foils and separators may be wound on a spindle to complete the capacitor manufacturing process. The foils and separators may also be folded to form non-cylindrical capacitors.

The resin curing process may be accelerated to reduce the curing time. For example, resin curing time is shortened using heat, pressure, vacuum, catalysts, or enzymes. A tab may be covered with an isolating patch prior to the cold welding, such as by coating the tabs after slitting from an electrode foil. The tabs may be coated with a polymer or resin before cold welding, such as a pre-coated spool of tab material or individual pre-coated and pre-cut tabs. A pre-coated spool of tab material may have coating of certain lengths, alternating along the spool, such that the coated length part is positioned on the electrode adjacent to the separator and the uncoated part is outside the spool for welding to a lead or terminal of the capacitor. For example, a first length of 3 centimeters (cm) is covered with an isolating material, a second length of 2 cm is not covered, and then this pattern repeats along the length of the material. A continuously pre-coated spool of tab material may be used to create tabs, where the tab extensions outside the electrode and separator winding may have the polymer or resin removed before welding to a terminal or lead, such as chemical removal, mechanical removal, electrical removal, or heat removal. For example, a spool of tab material includes a coating along the entire length of the tab material.

A capacitor disclosed herein may include an isolating material (mechanically, electrically, electrochemically, chemical-ionic, and/or chemically isolating) covering the electrode tabs of the anode, the cathode, or both. The isolating material may be a fiber, paper, polymer, a resin, or a ceramic. The isolating material may extend over the area of the tab, and at least some of the surrounding electrode foil. The material may be adjacent to the tab and on the electrode foil. The isolating material may have the same thickness as the tab to prevent the corner of the tab from affecting the capacitor operation. The isolating material may be below the separator or above the separator (depending on winding order). When the capacitor is wound, the isolation material may protect the separator from thinning due to the electrode tab and the isolation material may protect the parallel or opposing electrode foils. The isolation material thereby reduce electrical, chemical, electrochemical, chemical-ionic, or mechanical interactions and effects between the tabs and adjacent foils/separator paper. The isolating material may be polymers or resins (e.g., polyolefin, polyamide, polypropylene, or polyester) and may be acid-modified. The isolating materials may be a combination of an adhesive material and a protective isolating material. The isolating material, when attached to the electrode may prevent mechanical, electrical, electrochemical, chemical-ionic, and chemical "hot-spots" from developing at the sharp corners of attached to electrodes. As used herein, a hot-spot may be a location that may be energetically favorable to undergo a chemical, electrical, electrochemical, chemical-ionic, and/or mechanical reaction or interaction with other capacitor components. The resulting capacitor may have improved cost, improved lifetime, improved capacitance density, and/or improved manufacturing rate.

Capacitor tabs described herein may have tapered, rounded, or sloped edges, or have non-rectangular cross-sections (e.g., trapezoid, arc, or triangle). The tabs may also include rounded edges or corners. For example, a rectangular cross section tab may have edges covered with a material (not necessarily an isolating material), such as a polymer, a resin, a metal, and/or a ceramic, that modifies the rectangular cross section to a non-rectangular cross section shape, such as a trapezoid, an arc, a rounded corner rectangle, a cur corner rectangle, a bell shape, or a triangle with rounded apex. The tabs may be covered with an isolating material, and may include access recesses (e.g., holes) in the isolating material for attaching the tab to the electrode (e.g., by cold-welding).

Figure 2:
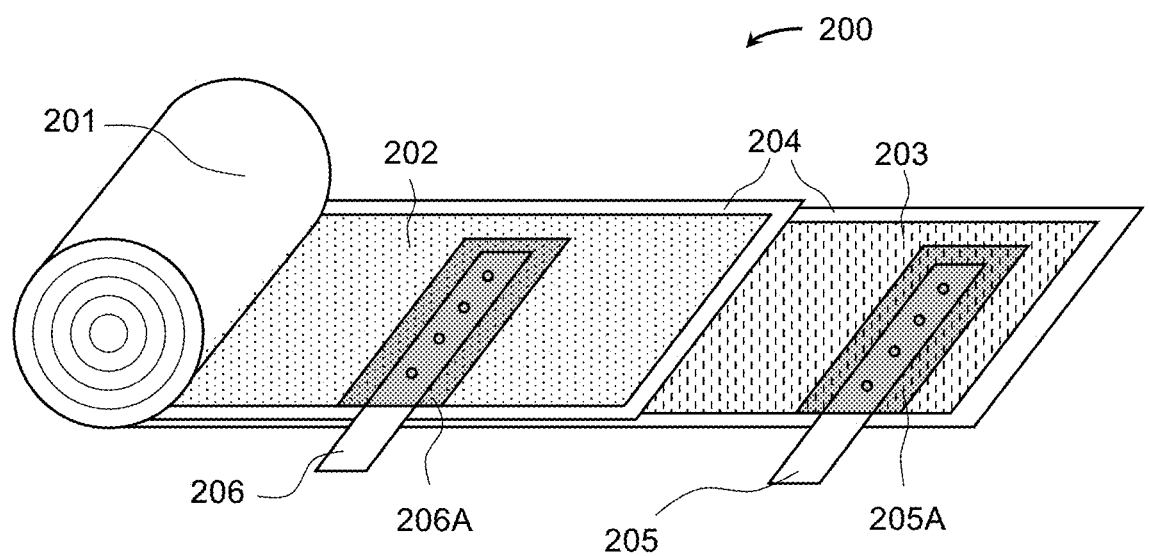
FIG. 2 shows an example capacitor internal element with coated electrode tabs.

Reference is now made to FIG. 2, which shows an example capacitor internal element 200 with electrode tabs 205 and 206. A rolled portion 201 of the internal element 200 may be unrolled, at least in part as in FIG. 2, to expose an anode 202 and a cathode 203, with one or more separators 204 in between them. The electrode tabs 205 and 206 may be attached to the cathode 203 and the anode 202, respectively. The electrode tabs 205 and 206 and their surrounding regions may be covered with isolation patchs 205A and 206A to prevent the electrode tabs 205 and 206 from causing malfunction (such as from mechanical, electrical, electrochemical, chemical-ionic, or chemical defects) to the capacitor during operation. The coatings 206A and 205A may be between the separators 204 and the opposing electrode 203 and 202 (not shown).

Reference is now made to FIG. 1A, which shows the cross-section view 100 of an example electrode tab 102 covered by an isolating patch 104. A separator 105 impregnated with electrolyte may separate the two electrodes 101 and 106. The electrodes 101 and 106 may be an anode and a cathode, respectively, or vice versa. The electrodes 101 and 106 may be foils. The electrolyte is an ionic conductor but an electronic isolator, thereby preventing a short circuit between the capacitor electrodes 101 and 106. The electrode tab 102 may be cold-welded (e.g., cold weld 103) to the electrode 101 and positioned on the side of the foil facing the separator 105. Cold weld 103 may be located around the periphery of the tab in addition to or instead of the middle, providing a mechanically stronger weld and reducing stress concentrations at the weld. As shown, the isolating patch 104 comprises a layer, for example, a tape, or a cover, disposed over the tab 102 and the surrounding regions of the electrode 101. The isolating patch 104 may be placed on the opposite side of the electrode tab 102 that is welded to electrode 101, such as the directly-opposing side of the electrode tab 104. For example, the isolating patch 104 may cover a region of the electrode 101, where the region extends to a predetermined distance 107 beyond the corners 109 of the electrode tab 102. The predetermined distance 107 may be at least 1 millimeter (mm), 2 mm, 2-5 mm, 1-10 mm, or 1-20 mm. The isolating patch 104 may also cover a region that extends to at least one circumference of the rolled portion 201 in FIG. 2. For example, an additional sheet of separator is located adjacent to separator 105 on the patchs of the rolled capacitor at the tab positions, such as attached by an adhesive. A further isolating patch 104 may be between the separator 105 and the opposing electrode 106 (not shown). In other embodiments, the isolating patch 104 may comprise a coating applied to the electrode tab 102.

Due to its corners 109, the electrode tab 102 may be prone to exhibiting a mechanical, electrical, electrochemical, chemical-ionic, or chemical concentrating effect on the separator 105 or opposing electrode 106. The isolating patch 104 may serve to counter these effects. As an example, the corners 109 of the electrode tab 102 may exhibit a higher local voltage and electrical field that exceeds the breakdown voltage of the electrolyte, resulting in the possible failure of the capacitor. As a further example, the corners 109 of the electrode tab 102 may exhibit a mechanical stress concentration effect, such as tensile or sheer stresses, resulting in the thinning of separator 105 at the corners 109, tearing/cutting of separator 105, or penetration of separator 105 such that electrodes 101 and 106 my short circuit. As a still further example, the corners 109 of the electrode tab 102 may exhibit a chemical effect, such as increased oxidation and gas production, resulting in a deforming of separator 105 near the corners 109. In addition, the corners 109 may exhibit a combination of effects, such as an increased voltage and decreased separation 105 thickness, resulting in the voltage exceeding the electrolyte breakdown voltage and the possible failure of the capacitor. In one example, adding a thin layer or coating of a polymer film that has a rigidity greater than the separator may reduce the local stresses caused by the corners of the electrode tabs, thereby reducing the amount of local thinning in the separator at the locations around the electrode tabs. The isolating patch thereby preserves the integrity of the separator and adjacent electrodes distal to the electrode tab and isolating patch.

A covering, in the form of coating or a layer, at least in part, of the electrode tabs with rectangular cross-section (e.g., the usual 90 degree angled corners 109) may reduce the detrimental effects of these sharp corners. Electrode tabs with non-rectangular cross-sections such as cross-sections with obtuse angles (e.g., 120 degrees, 135 degrees, or 160 degrees), rounded corners, beveled corners, or s-shaped corners/edges may also reduce the detrimental effects. This is discussed later in connection with FIG. 1C.

Figure 1B:
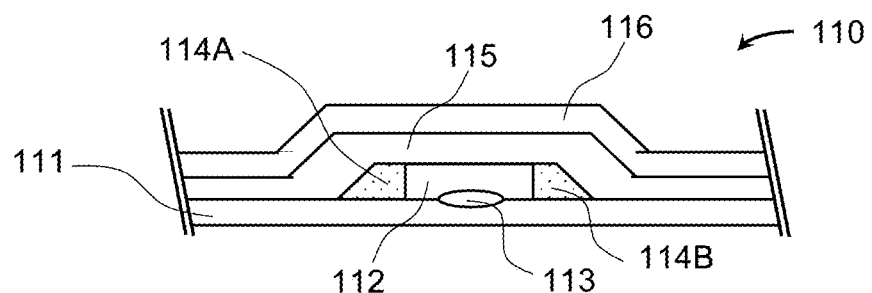
FIG. 1B shows a cross-section view of an example coated electrode tab with two vertical edges.

A partial covering of the electrode tabs may be performed on selected (side) edges of the electrode tab to reduce the negative effects of the 90 degree angled corners 109 of the electrode tab 102 on the separator 105. For example, coating the edges of the electrode tab with a rectangular cross section may change the shape to a trapezoid cross section. For example, applying a resin bead along the edges of the electrode tab may change the cross section shape to a rectangle with rounded corners. Reference is now made to FIG. 1B, which shows an example cross-section view 110 of an electrode tab 112 with an isolating patch comprising coating portions 114A and 114B on first and second edges. The electrode 111 may be separated from another electrode 116 by an electrolyte impregnated separator 115. An electrode tab 112 may be cold-welded (e.g., with cold-weld 113) to the electrode 111 and positioned on the side of the electrode foil facing the separator 115 or the reverse side (not shown). As shown, coating portions 114A and 114B are disposed on the edges of electrode tab 112 and adjacent regions of electrode 111. Preferably, but not essentially, the coating portions 114A and 114B are connected by a third coating portion on a third edge of the electrode tab (not visible in FIG. 1B). The coating portions 114A and 114B may be formed on the opposite side of the electrode tab 112 that is welded to electrode 111, such as the directly-opposing side of the electrode tab 112. For example, the coating portions 114A and 114B cover a region of at least 1 millimeter (mm), 2 mm, 2-5 mm, 1-10 mm, or 1-20 mm of the electrode foil extending beyond the edges of the electrode tab 112. In another example, the coating portions 114A and 114B may cover at least one circumference of the rolled portion 201 in FIG. 2. Benefits of coated tab edges may also include a higher capacitance density, lower equivalent serial resistance, less hydrogen production from raw metal edges, and/or hermetically sealing of the cold weld region. Coated edges with a coating also covering the tab completely may also allow using a softer, less expensive conducting foil as it will not interact with the electrolyte. In other embodiments, the coating portions 114A and 114B and the unshown coating portion may comprise a corresponding layer(s), for example, in the form of a bead(s), a tape(s) or a cover(s) with the same benefits.

Figure 1C:
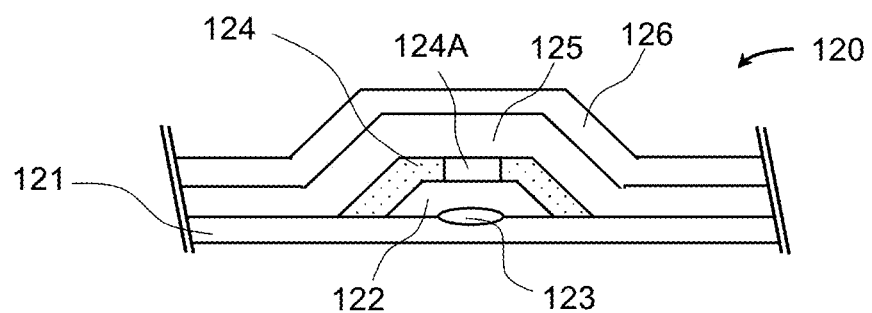
FIG. 1C shows a cross-section view of an example coated electrode tab with sloping edges.

Reference is now made to FIG. 1C, which shows, schematically, an example cross-section view 120 of an electrode tab 122 with sloping edges. The electrodes 121 and 126 (e.g., an anode and a cathode or vice versa) may be separated by an electrolyte impregnated separator 125. A non-rectangular electrode tab 122 may be cold-welded to the electrode 121, and positioned on the side of the electrode foil facing the separator 125. An isolating patch 124 may be positioned over the electrode tab 122 and adjacent regions of electrode 121. For example, the isolating patch 124 may cover a region of at least 1 mm, 2 mm, 2-5 mm, 1-10 mm, or 1-20 mm of the electrode foil extending beyond the sides of the electrode tab 122. For example, the isolating patch 124 may cover at least one circumference of the rolled portion 201 in FIG. 2. As shown, the isolating patch may comprise a coating of an isolating material may be deposited on the electrode tab 122, and a recess 124A may be incorporated in the coating to allow access of a tool for cold welding the electrode tab 122 to the electrode 121. In other embodiments, the isolating patch 124 may comprise a corresponding layer, for example, in the form of a tape or cover.

Figure 1D:
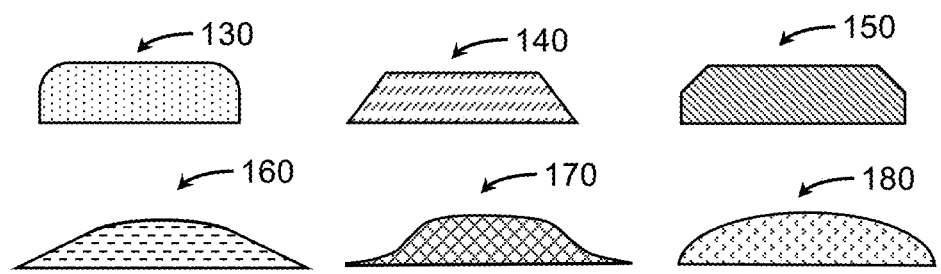
FIG. 1D shows cross-section views of coated electrode tabs with sloping and rounded edges.

An electrode tab may have a cross-section with a non-rectangular shape with multiple facets. Reference is now made to FIG. 1D, which shows example cross-section views of electrode tabs with sloping or rounded edges. For example, the cross-section of the electrode tab 180 may be shaped like an arc. The corners of an electrode tab 130 may be rounded. The corners of the electrode tab 150 may be sloped. For example, the edges of the rectangle may be sloped. An electrode tab 140 may have sloped edges or have a trapezoidal cross-section. The electrode tab 160 may have a combined sloped with rounded apex or a bell shape. The electrode tab 170 may have s-shaped edges.

A tab with a non-rectangular cross-section may be formed by processing of a rectangular tab, such as by plastic deformation or cutting (e.g. shaving, slitting, extruding, pressing, or forging). The processing creates a non-rectangular cross-section or profile, such as tabs 130, 140, 150, 160, 170, 180. For example, a tab may be formed by slitting an 800 volt electrode foil, such as an anode foil, and then milling the longitudinal corners to a round shape. For example, during cold pressing, the tab side die comprises a shaped mold that causes plastic deformation of the longitudinal corners of the tab. As used herein, the longitudinal corners of the tab means the two corners of the cross section, along the length of the tab, parallel to the axis cylindrical, and perpendicular to the rolling direction.

The tab may be formed from unprocessed aluminum or a formed foil that may be processed to expose raw aluminum. The raw aluminum may be passivated (formed), such as by inserting into a series of chemical baths while voltage is applied, as is done for electrode foils. For example, an edge passivating machine may be positioned between the tab spools (raw material) and the cold welder. The tabs spools may be made from processed rectangular cross section foils, that may be slit at alternating angles, such as 45 degree angles. In this manner, half of the tabs from the foil may be trapezoids facing upward and the other half (or substantially half) are facing downward. The raw aluminum of the 45 degree edges of the trapezoid cross section tabs, exposed after slitting, may be passivated by immersion in a series of baths with chemicals under an applied voltage to passivate the exposed edges.

Figure 3:
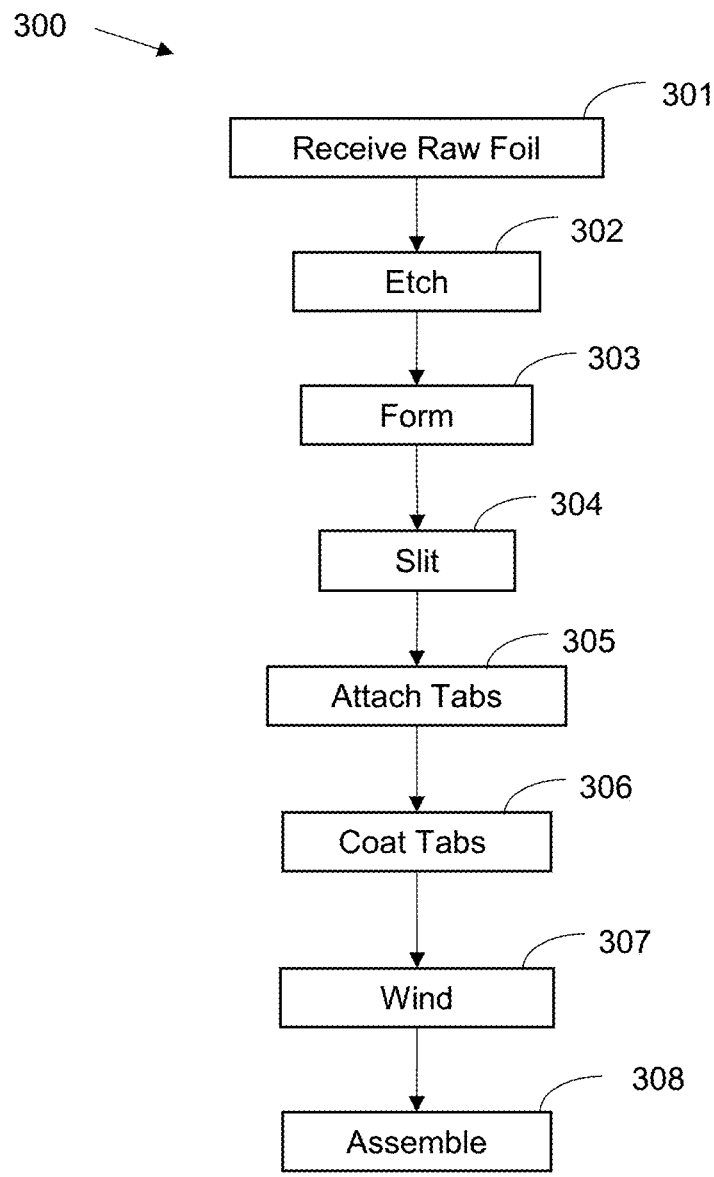
FIG. 3 shows a flowchart of an example method of manufacturing capacitors with coated electrode tabs.

Reference is now made to FIG. 3, which shows a flowchart 300 of an example method for manufacturing capacitors with coated electrode tabs. A raw foil may be received at step 301 and etched at step 302. The dielectric may be formed by anodizing the etched foil as at step 303. Slits may be formed in the aluminum foil as at step 304 to cut the wider foil into the widths needed for the capacitors' internal elements. The tabs may be attached at step 305. The tabs may be formed by slitting a conducting foil with alternately angled blades at an angle less than 90 degrees, such as between 20 to 70 degrees. The tabs may be attached by various processes, such as cold welding, ultrasonic welding, laser welding, or conducting adhesive attachment. The tabs, and possibly some of the surrounding electrode, may be coated as at step 306, such as covering the tabs with tapes, film, paint, or separation papers. For example, the coating may be done by spray painting the tab regions with a polymer or resin. The isolating materials may be a combination of an adhesive material and a protective isolating material (protecting mechanically, chemically, electrochemical, chemical-ionic, and/or electrically). For example, the coating may be done by applying a tape of a polymer with an adhesive. For example, the coating or isolating material may be a paper separator material with an adhesive on one side to retain the isolating material in the planned location during winding. For example, a first adhesive material may be applied to the foil or tab, and a second isolating material may be applied to the adhesive, tab, and/or foil. For example, the tabs are covered with a second patch of separation paper only covering the tab and the adjacent region. The foil with the isolated tabs are wound with separator and cathode onto a spool as at step 307, and assembled as at step 308.

Figure 4:
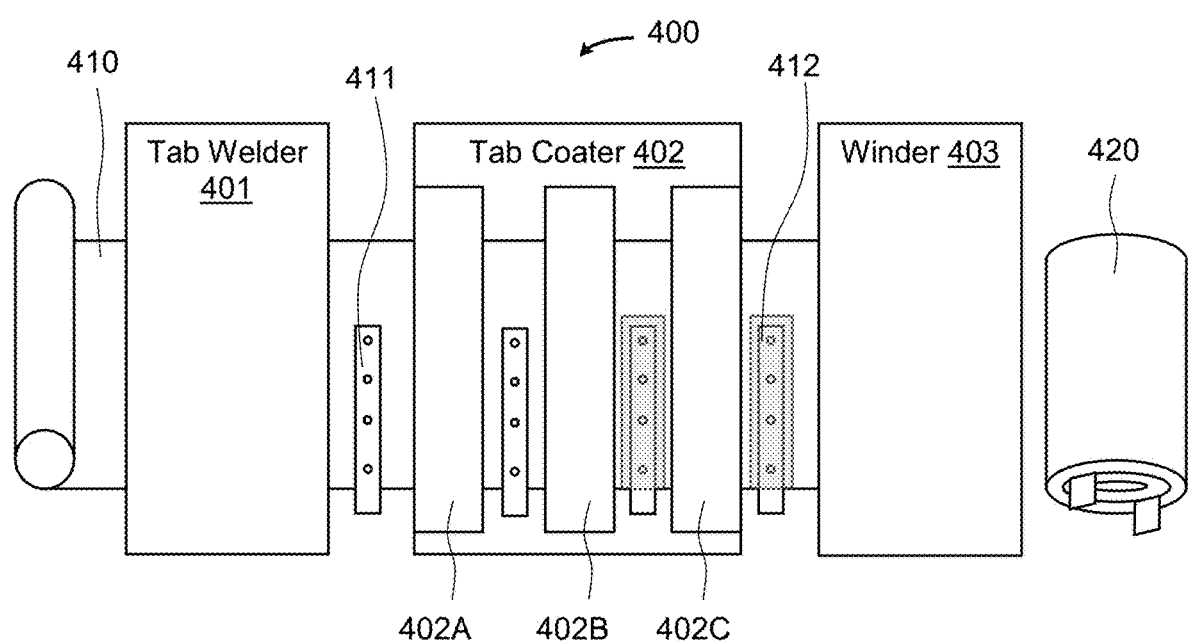
FIG. 4 shows an example system for manufacturing capacitors with coated electrode tabs.

Reference is now made to FIG. 4, which shows an example system 400 for manufacturing a capacitor with coated-electrode tabs. An electrode foil 410 may be processed as usual up to and including slitting. A tab welder 401 may attach tabs to the electrode foil 410, resulting in an electrode with tabs 411. Electrode with tabs 411 may enter a tab coater 402 at an entry gantry 402A, and travels to a coating device 402B, and exits at an exit gantry 402C. The electrode with coated tabs 412 may then be wound in a winder 403, and further assembled as usual to produce a capacitor's internal element with coated-electrode tabs 420. It may be noted that tab coater 402 may be incorporated into tab welder 401 or winder 403. For example, a tab welder may also apply an isolation material before or after welding. For example, a winder may be configured to insert an isolation material over the tabs when winding a cylindrical capacitor. For example, a non-cylindrical capacitor may be folded with a folding device, and the folding device may be configured to insert an isolation material over the tabs when folding. It may further be noted that when the tab is pre-coated before being welded, there may be changes to welding (or attaching) device 401, such as a sensor to locate the recesses 124A. When tabs 411 include a non-rectangular cross-section, tab coater 402 may apply a reduced thickness isolated patch as the corners of the tab may be rounded and produce fewer concentration effects. Electrode tabs with non-rectangular cross-sections may be manufactured by rolling, extruding, stamping, or shaping a conducting metal. For example, rolling aluminum foil may be done with one flat roller and one bumped roller, so that the tabs are shaped by the valley between the bumps (negative of the tab shape). The bumped roller makes each tab have a thick center and thin edges, where the edges are thick enough to support the foil until slitted to individual tabs. Similarly, a shaped foil for creating electrode tabs by slitting may be manufactured using a three-dimensional (3D) printer. Similarly, shaped electrode tabs can be directly 3D printed on the electrode foils (anode and cathode foils).

Materials suitable for electrical isolation of the tabs include, for example, polymers, ceramics, oxides, or resins. The isolating material may be chemically neutral with regards to chemical interaction with, for example, the aluminum, electrolyte, hydrogen, or other elements/molecules found in the capacitor during manufacturing and operation. For example, the polymer used for isolating the electrode tabs may be selected to avoid chemical reaction with boric acid used as an electrolyte. For example, capacitors using anhydrous electrolytes may use isolating coatings with an inert polymer material, such as polycarbonate or epoxy resin. For example, a capacitor with a dimethylformamide (DMF), dimethylacetamide (DMA), or γ-butyrolactone (GBL) electrolyte may use an epoxy resin to coat the electrode tabs before winding. Additives to the electrolyte may be used to prevent reactions with the electrolyte water.

The isolation material and coating properties may also be selected based on the operating properties of the capacitor, such as maximum operating voltage, maximum operating temperature, or mechanical stress. For example, the maximum operating temperature of the capacitor is 105 degrees centigrade, and the glass transition temperature of the isolating polymer may be selected to be above 125 degrees centigrade. For example, the maximum operating voltage of the capacitor is rated for a 500-volt direct current voltage, and material for the isolation of the electrode tabs may be selected to have a 700-volt breakdown voltage. For example, the capacitor is rated to withstand strong vibrations and g-forces, and the coating may be selected to have a strong adhesion to the foil, and to have a high elastic modulus and tensile strength.

Other materials that may be used for isolating the electrode tab region include, for example: polypyrrole and its derivatives, polythiophene and its derivatives, polyethylene dioxythiophene and derivatives thereof, propylene rubber, fluorocarbon resin, epoxy resin, polyacetal resin, thermoplastic resin, thermosetting resin, furan resin, phenol resin, urea resin, polyimide unsaturated polyester resins, urethane resins, acrylonitrile butadiene styrene (ABS) resin, polyethylene terephthalate resin, polybutylene terephthalate resin, nylon, polycarbonate, acrylic resin, polystyrene, polypropylene, polyethylene, natural rubber (NR), styrene-butadiene (SBR), isobutylene-isoprene rubber (IIR), vulcanized IIR with, for example, sulfur vulcanization, quinoid vulcanization, resin vulcanization, or peroxide vulcanization, polytetrafluoroethylene (PTFE), fluororesin, silicone resin such as polysiloxane, fluorine resin, Bakelite resin, and/or ceramic materials.

Other materials that may be used include, for example: tetrafluoroethylene (TFE), a polyester resin, a polyamide resin, an acid-modified polyolefin resin, polyphenylene sulfide, a liquid crystal polymer, engineering plastics, glass filler-containing glass filler-containing polybutylene terephthalate, glass filler-containing nylon or glass filler-containing polyphenylene sulfide, polyethylene terephthalate (PET), polybutylene terephthalate (PBT), polyphenylene sulfide (PPS), polyamide, resin-vulcanized butyl rubber, peroxide-vulcanized butyl rubber, and/or ethylene-propylene rubber (EPT).

Other materials for isolating the electrode tab region may include, for example: polyolefin resin (e.g., ionomeric, or nylon 6, nylon 6.6, nylon 11, nylon 12, etc.), polypropylene resin, polyimide, crystalline engineering plastic, polyether ether ketone, polyether nitrile, ethylene propylene copolymers, ethylene-vinyl acetate copolymers, ethylene-acrylate ester copolymer (e.g., polyethylene naphthalate), and/or polyesters (e.g., ethylene terephthalate/isophthalate copolymer). For example, a thermosetting adhesive polymer, such as a hot-melt adhesive, may be used to coat the electrode tab region of a capacitor.

In some cases, an adhesive may be used for the isolating strips, for example, epoxy-based adhesives, phenolic adhesives, acid-modified olefin resin adhesive, copolyamide adhesive, and/or co-polyester based adhesive. In some examples, a combined isolating material may be used (e.g., the first layer of an adhesive and a second layer of an isolating polymer, such as a tape, or a first layer of an electrically isolating polymer and a second layer of a chemically isolating material).

Some examples of tape material that may be used for coating tabs are DAEIL INDUSTRY model PPT-125 and/or NITTO model 3703DF. DAEIL INDUSTRY model PPT-125 is an acrylic backed film (e.g., polypropylene) with a thickness of 30 micrometers (μm) and an adhesive back. The tape has an adhesion strength of 625 grams per 25 mm. NITTO model 3703DF is also a polypropylene adhesive tape with a total thickness of 55μ and peel adhesion of 3.6 newtons per 10 mm. Similarly, TARGRAY has adhesive tapes made of acid-modified polypropylene or polyester.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

Clauses

Clause 1. A capacitor comprising: an anode foil; a cathode foil; a separator between the anode foil and the cathode foil; an electrode tab attached to one of the anode foil or the cathode foil; and an isolating patch between the electrode tab and the separator.

Clause 2. The capacitor of Clause 1, wherein the isolating patch comprises at least one of a mechanically isolating material, an electrically isolating material, an electro-chemically isolating material, and a chemical-ionic isolating material to isolate the electrode tab from the separator.

Clause 3. The capacitor of any one of Clauses 1-2, wherein the isolating patch is in contact, at least in part, with the anode or cathode foils.

Clause 4. The capacitor of any one of Clauses 1-3, wherein the electrode tab is covered, at least in part, by the isolating patch.

Clause 5. The capacitor of any one of Clauses 1-4, wherein the isolating patch further covers, at least in part, an adjacent region of the anode or cathode foils surrounding the electrode tab.

Clause 6. The capacitor of Clause 5, wherein the the adjacent area is no further than 10 millimeters from an edge of the electrode tab.

Clause 7. The capacitor of Clause 5, wherein the adjacent area is no further than 5 millimeters from an edge of the electrode tab.

Clause 8. The capacitor of any one of Clauses 1-7, wherein the electrode tab comprises surfaces, edges, or corners that are rounded, sloping, arc-shaped, having an angle greater than 90 degrees, bell shaped or s-shaped.

Clause 9. The capacitor of any one of Clauses 1-8, herein the isolating patch comprises an isolating polymer film.

Clause 10. The capacitor of any one of Clauses 1-9, wherein the isolating patch comprises an adhesive.

Clause 11. The capacitor of any one of Clauses 1-10, wherein the anode foil and the cathode foil each comprise aluminum, copper, nickel, or zinc.

Clause 12. A method of manufacturing a capacitor, comprising: attaching at least one electrode tab to at least one conducting foil; covering the at least one electrode tab and at least an adjacent region of the at least one conducting foil with an isolating material; and winding the at least one conducting foil with a separator to form a roll.

Clause 13 The manufacturing method of Clause 12, wherein the electrode tab comprises a plurality of sides, wherein covering the electrode tab comprises covering at least part of one side, of the plurality of sides, with an isolating material.

Clause 14. The manufacturing method of any one of Clauses 12-13, wherein edges of the electrode tab are rounded, sloping, arc-shaped, having an angle greater than 90 degrees, bell shaped or s-shaped.

Clause 15. The manufacturing method of any one of Clauses 12-14, further comprising forming the electrode tab by rolling, three-dimensional (3D) printing, or extruding a conducting metal.

Clause 16. The manufacturing method of any one of Clauses 12-15, wherein the isolating material is configured for at least one of mechanical isolation, electrical solation, electro-chemical isolation, and chemical-ionic isolation.

Clause 17. An electrode tab for manufacturing a capacitor, comprising an isolating material covering a first surface area of the electrode tab, wherein a second surface area of the electrode tab is configured to be attached to a conducting foil of the capacitor.

Clause 18. The electrode tab of Clause 17, wherein the first surface area is on an opposite surface from the second surface area.

Clause 19. The electrode tab of Clause 17 or 18, wherein the first surface area is on a directly-opposing opposite surface from the second surface area.

Clause 20. The electrode tab of one of Clauses 17-19, wherein the isolating material comprises at least one of a mechanically isolating material, an electrically isolating material, an electro-chemically isolating material, and a chemical-ionic isolating material to isolate the electrode tab from the separator.

Clause 21. The electrode tab of one of Clauses 17-20, wherein the electrode tab comprises surfaces, edges, or corners that are rounded, sloping, arc-shaped, having an angle greater than 90 degrees, bell shaped or s-shaped.

Clause 22. The electrode tab of one of Clauses 17-21, wherein the first surface area comprises a recess configured for attaching the second surface area to the conducting foil.

Clause 23. An electrode tab for manufacturing a capacitor comprising: a first surface area configured to be attached to a conducting foil of the capacitor, and a second surface area configured to be adjacent to a separator of the capacitor, wherein the second surface comprises at least one of: (i) multiple facets, (ii) rounded surfaces, (iii) multiple facets with rounded corners or obtuse angles, or (iv) rounded corners.

Clause 24. The electrode tab of Clause 23, wherein the first surface area is on an opposite side of the electrode tab from the second surface.

Clause 25. The electrode tab of Clause 23 or 24, wherein the second surface is covered with an isolating material.

Clause 26. A capacitor comprising: an anode foil; a cathode foil; a separator between the anode foil and the cathode foil; and an electrode tab attached to one of the anode foil or the cathode foil, wherein the electrode tab comprises: a first surface area attached to the conducting foil, and a second surface adjacent to the separator, wherein the second surface comprises at least one of: (i) multiple facets, (ii) rounded surfaces, (iii) multiple facets with rounded corners or obtuse angles, or (iv) rounded corners.

Clause 27. The capacitor of Clause 26, further comprising an isolating patch located between the electrode tab and the separator.

Clause 28. The capacitor of any one of Clauses 26-27, further comprising an isolating patch covering the electrode tab and a region of the anode foil or the cathode foil adjacent to the electrode tab.

Clause 29. The capacitor of Clauses 27 or 28, wherein the isolating patch comprises at least one of a mechanically isolating material, an electrically isolating material, an electro-chemically isolating material, and a chemical-ionic isolating material to isolate the electrode tab from the separator.

Clause 30. The capacitor of Clauses 27 or 28, wherein the isolating patch is in contact, at least in part, with the anode or cathode foils.

Clause 31. The capacitor of any one of Clauses 26-30, wherein the electrode tab is covered, at least in part, by an isolating patch.

Clause 32. The capacitor of Clauses 27 or 28, wherein the isolating patch further covers, at least in part, an adjacent area of the anode or cathode foils surrounding the electrode tab, and the adjacent area is no further than 10 millimeters from any edge of the electrode tab.

Clause 33. The capacitor of any one of Clauses 26-32, wherein the electrode tab comprises surfaces, edges, or corners that are rounded, sloping, arc-shaped, having an angle greater than 90 degrees, bell-shaped or s-shaped.

Clause 34. The capacitor of Clauses 27 or 28, wherein the isolating patch comprises an isolating polymer film.

Clause 35. The capacitor of Clauses 27 or 28, wherein the isolating patch comprises an adhesive.

Clause 36. The capacitor of any one of Clauses 26-35, wherein the anode foil and the cathode foil each comprise aluminum, copper, nickel, or zinc.

Clause 37. A method of manufacturing an electrode tab, comprising at least one of:
printing, using a 3D metal printer, a conducting foil with a 3D shape comprising a first flat surface and a second surface; rolling a conducting metal to shape a first flat surface and a second surface; slitting a conducting foil with alternately angled blades at an angle less than 90 degrees to produce a first flat surface and a second surface; or extruding a conducting metal to shape a first flat surface and a second surface, wherein the second surface comprises at least one of: (i) multiple facets, (ii) rounded surfaces, (iii) multiple facets with rounded corners therebetween, (iv) multiple facets with obtuse angles therebetween, or (v) rounded corners.

Clause 38. The electrode tab of Clause 37, wherein the first flat surface is on an opposite side of the electrode tab from the second surface.

The invention claimed is:

1. A capacitor comprising:
an anode foil;
a cathode foil;
a separator between the anode foil and the cathode foil;
an electrode tab attached to one of the anode foil or the cathode foil, wherein the electrode tab comprises a plurality of surfaces, and wherein the plurality of surfaces comprises a first surface attached to the one of the anode foil or the cathode foil, and a second surface that is:
bell-shaped,
trapezoidal shaped, or
separated from the first surface by an s-shaped edge; and
an isolating patch between the electrode tab and the separator, wherein the isolating patch mechanically and chemically isolates at least a portion of the electrode tab from the separator.

2. The capacitor of claim 1, wherein the isolating patch further electrically isolates the electrode tab from the separator.

3. The capacitor of claim 1, wherein the isolating patch is in direct contact with, at least in part, an adjacent region, around the electrode tab, of the one of the anode foil or the cathode foil.

4. The capacitor of claim 3, wherein an edge of the adjacent region is less than 10 millimeters from an edge of the electrode tab.

5. The capacitor of claim 3, wherein an edge of the adjacent region is less than 5 millimeters from an edge of the electrode tab.

6. The capacitor of claim 3, wherein the isolating patch comprises:
a layer of an adhesive material and a layer of an isolating polymer; or
a layer of an electrically isolating polymer and a layer of a chemically isolating material.

7. The capacitor of claim 1, further comprising a second isolating patch;
wherein the electrode tab further comprises:
a third surface positioned between the first surface and the second surface, and
a fourth surface positioned between the first surface and the second surface and opposite to the third surface;
wherein the second surface is opposite to the first surface and is covered at least in part by the separator,
wherein the third surface, and a first adjacent region around the third surface of the one of the anode foil or the cathode foil, is covered at least in part by the isolating patch; and
wherein the fourth surface, and a second adjacent region around the fourth surface of the one of the anode foil or the cathode foil, is covered at least in part by the second isolating patch.

8. The capacitor of claim 1, wherein the isolating patch comprises an adhesive material that adheres the isolating patch to the one of the anode foil or the cathode foil.

9. The capacitor of claim 1, wherein:
the second surface is bell-shaped and separated from the first surface by a plurality of edges; or
the second surface is bell-shaped and separated from the first surface by the s-shaped edge.

10. The capacitor of claim 1, wherein the isolating patch adheres to, at least in part, an adjacent region, around the electrode tab, of the one of the anode foil or the cathode foil.

11. A method, comprising:
positioning at least one electrode tab on one side of a conducting foil, wherein the at least one electrode tab comprises a plurality of surfaces, wherein the plurality of surfaces comprises a first surface and a second surface that is:
bell-shaped,
trapezoidal shaped, or
separated from the first surface by an s-shaped edge;
attaching the first surface of the at least one electrode tab to the one side of the conducting
covering the at least one electrode tab and at least an adjacent region, around the at least one electrode tab, of the one side of the conducting foil with an isolating material that mechanically and chemically isolates the at least one electrode tab from a separator; and winding the conducting foil with the separator to form a roll.

12. The method of claim 11, wherein the electrode tab comprises a rounded or beveled corner between the second surface and the s-shaped edge.

13. The method of manufacturing of claim 11, further comprising forming the at least one electrode tab by rolling, three-dimensional printing, or extruding a conducting metal.

14. An assembly comprising:
an electrode tab comprising:
a first surface configured to be attached to of an anode foil or a cathode foil; and
an second surface, wherein the second surface is:
bell-shaped,
trapezoidal shaped, or
separated from the first surface by an s-shaped edge; and
an isolating patch that covers at least a portion of the electrode tab and that mechanically and chemically isolates the portion of the electrode tab from a separator between the one of the anode foil or the cathode foil and another anode foil or cathode foil.

15. The assembly of claim 14, wherein the isolating patch comprises a recess configured to allow access to the second surface by a tool for cold welding the first surface to the one of the anode foil or the cathode foil.

16. The assembly of claim 14, wherein:
the second surface is bell-shaped and separated from the first surface by a plurality of edges; or
the second surface is bell-shaped and separated from the first surface by the s-shaped edge.

17. The electrode tab of claim 14, wherein the isolating patch is adhered to an adjacent region, around the electrode tab, of the one of the anode foil or the cathode foil.

18. The electrode tab of claim 14, wherein the isolating patch comprises:
a layer of an adhesive material and a layer of an isolating polymer; or
a layer of an electrically isolating polymer and a layer of a chemically isolating material.

* * * * *